United States Patent Office 3,248,618
Patented Apr. 26, 1966

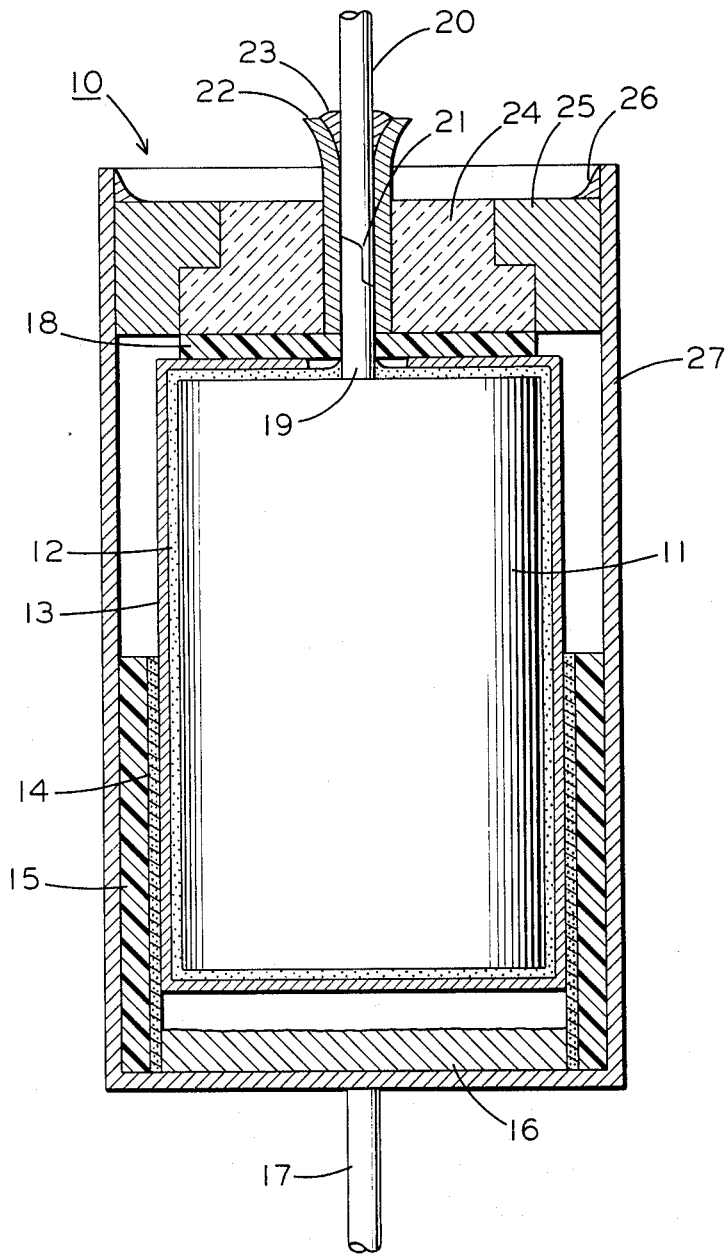
STANLEY P. SZPAK
WALTER J. BERNARD
*INVENTORS.*

3,248,618
SELF-CLEARING CONTACT TO METALLIZED
TANTALUM CAPACITOR
Stanley P. Szpak, Williamstown, and Walter J. Bernard,
Cheshire, Mass., assignors to Sprague Electric Company, North Adams, Mass., a corporation of Massachusetts
Filed Mar. 26, 1962, Ser. No. 182,569
5 Claims. (Cl. 317—258)

The present invention relates to tantalum capacitors and more particularly to self-clearing contacts in tantalum capacitors.

It is known that a dry tantalum capacitor can be produced by anodizing the tantalum and depositing on the anodic oxide, by surface catalyzed chemical reduction, a metal counterelectrode. More specifically, in one method the surface of a tantalum body, conveniently in the form of a porous pellet, is oxidized by means of an aqueous phosphoric acid solution at an elevated temperature, with an applied voltage being gradually raised to a maximum while maintaining a high current density. Thereafter, the oxide film is metal-plated by surface catalyzed chemical reduction (also known as electroless plating). A preferred metal for plating is nickel. One suitable bath solution for electroless nickel plating is Brenner's "acid bath B" (U.S. Bureau of Standards Circular, March 1, 1958). Plating may be carried out by vacuum impregnation or by sucking the warm or hot solution through the anodized, porous pellet.

For the purpose of forming a capacitor it is necessary to make a suitable contact with the plated nickel. This poses a serious problem since experience has shown that any type of a massive contact will lead to complete failure in the event a short develops beneath the contact. Under applied voltage, sparking occurs at points of dielectric weakness between the contact and the anode. If the sparking is not in some way interrupted, a permanent short results. When a massive contact is employed, e.g. a soldered lead, the sparking cannot be interrupted because the very massiveness of the metal at the point of contact prevents volatilization of the metal at the point of sparking. The contact dissipates the heat generated at the short and the area will not clear. The result is a permanent short.

It is an object of the present invention to overcome the foregoing and related problems.

It is another object of the instant invention to present a capacitor wherein shorting will be only momentary.

It is yet another object to present a tantalum-capacitor having a unique self-clearing contact.

Other objects will be apparent from the following specification when read in conjunction with the accompanying drawing in which:

The single figure of the drawing is a side view, in section, of a tantalum pellet capacitor.

Broadly, the objects of the invention are achieved by providing a tantalum pellet capacitor with a contact which is a metallized plastic member positioned about the processed pellet.

In the drawing, 10 is a tantalum capacitor comprising a tantalum pellet 11, which has a tantalum oxide dielectric 12 formed on the entire surface thereof; a layer of nickel 13 is plated over the oxide, formed e.g., by surface catalyzed chemical reduction. Such a capacitor is sometimes referred to as an electrostatic capacitor. A metallized inner surface 14 of a plastic sleeve 15 is in contact with the nickel 13; metallized surface 14 and the bottom of metal can 27 are contacted by means of a conductive composition 16; lead 17 is affixed to can 27; insulating spacer 18 is positioned about tantalum lead 19; a solderable lead wire 20 is welded to lead 19 at 21, a tinned copper eyelet 22 is positioned about the joined leads 19 and 20 and soldered at 23; a glass annulus 24 is positioned about eyelet 23 and metal ring 25 is positioned about glass annulus 24 and soldered at 26 to can 27.

The plastic sleeve 15 can be of any heat shrinkable plastic so that a uniformly tight fit is insured. A material answering this description is polyethylene terephthalate sold under the trademark Mylar. This sleeve is metallized on the inside by any convenient method, such as, by spraying or by thermal evaporation. Alternatively the sleeve may be metallized inside and out, including the edges thereof.

A modified form of the instant invention involves making contact by means of a heat shrinkable plastic cup e.g., Mylar, which is metallized inside and out, including the edges thereof.

There are no definite limits for the amount of surface area of the processed tantalum body which must be contacted with the metallized member. With a porous cylindrical or plug-shaped pellet for example, the sleeve or cup may contact all or part of the vertical surface. Conveniently, the sleeve (or cup) may contact about one-half the surface as shown in the figure.

When the sleeve is employed, one end thereof must extend beyond the nickel-plated anodized tantalum body, as shown in the drawing. This keeps the processed tantalum body from direct contact with the bottom of the metal container. This, of course, is not necessary when a metallized cup is employed.

The capacitors of the present invention may be formed in the following manner: A Mylar sleeve, metallized with, for example, either aluminum or zinc is positioned about a nickel-plated, anodized porous tantalum pellet. This sleeve covers about one-half of the surface of the pellet and extends some short distance away from the end of the pellet. Initially, the sleeve does not fit tightly about the pellet, but when sufficient heat is applied the Mylar shrinks so that the metallized surface makes intimate contact with the nickel surface of the pellet. There are several types of commercially available Mylar which differ in the degree of shrink they will exhibit when subjected to heat. The degree of shrink depends upon the amount of stretch the polymer was subjected to during the orientation thereof. The shrink temperature will fall within about 105° C. to about 170° C. depending upon the particular Mylar employed. Within the limits of these variables, an unshrunken sleeve or cup is selected of such a size that when subjected to the optimum temperature and time, sufficient shrinkage will be effected to bring about intimate contact between the metallized layer and the nickel surface of the pellet. After the sleeve has been shrunken, the capacitor unit, i.e. the processed pellet and metallized sleeve, is inserted into an aluminum container. In the bottom of the container is an electrically conductive composition, e.g., silver paint. The capacitor unit is inserted into the container so that contact is made between the extended metallized sleeve and the container by means of the conductive composition. The capacitor is then hermetically sealed by means well-known to those skilled in the art, e.g. a glass-to-metal seal.

The heat-shrinkable plastic is not limited to polyethylene terephthalate, but may be poly 1,4 cyclohexylenedimethylene terephthalate (sold under the trademark Terafilm) or any other plastic exhibiting the same characteristics. The electrically conductive composition can be any of a variety of materials, e.g. solder, silver paint, conductive epoxy adhesive, etc. The metal container can be any conductive material, e.g. aluminum, silver, tinned copper, etc.

The outstanding feature of the instant invention is the self-healing property of the capacitor under a slight excess of voltage. When sparkling occurs at points of dielectric weakness under the contact, the thin film of contact metal volatilizes from these local spots interrupting the short. Thus, the faults are isolated and the capacitor is restored to satisfactory operation.

Since many variations of the present invention will now be obvious to those skilled in the art we do not wish to be limited by other than the following claims.

We claim:

1. A tantalum capacitor comprising a porous tantalum body having a lead extending therefrom, a tantalum dielectric oxide film on said body, a nickel surface plated on the dielectric film, and a heat-shrunken plastic member having a metallized surface positioned about said body with said metallized surface in intimate contact with said nickel surface.

2. A tantalum capacitor comprising a porous tantalum body having a lead extending therefrom, a tantalum dielectric oxide film on said body, a nickel surface plated on the dielectric film and a heat-shrunken plastic member metallized at least on the surface thereof, said plastic member positioned about and in intimate contact with said nickel surface.

3. A tantalum capacitor comprising a porous tantalum body having a tantalum lead extending therefrom, a dielectric oxide film on said body, a nickel surface plated on the dielectric film and a heat-shrunken plastic cup having a metallized surface positioned about and in intimate contact with said nickel surface.

4. A tantalum capacitor comprising a porous tantalum pellet having a lead extending therefrom, a tantalum dielectric oxide film on said pellet, a nickel surface plated on the dielectric film, a heat-shrunken plastic sleeve having a metallized inside surface positioned about said pellet with said metallized surface in intimate contact with said nickel surface, said metallized sleeve extending beyond said pellet, this capacitor unit being positioned within a metal container, an electrically conductive composition making contact between the extended metallized sleeve and said metal container and with a glass to metal seal hermetically sealing said capacitor in said container.

5. A tantalum capacitor comprising a porous tantalum pellet having a lead extending therefrom, a tantalum dielectric oxide film on said pellet, a nickel surface plated on the dielectric film, a heat-shrunken plastic cup having a metallized surface positioned about said pellet with said metallized surface in intimate contact with said nickel surface, this capacitor unit being positioned within a metal container, an electrically conductive composition making contact between said metallized cup and and the container and a glass to metal seal hermetically sealing said capacitor in said container.

References Cited by the Examiner

UNITED STATES PATENTS 2,527,373 10/1950 Parson _____ 29—25.42 X
3,036,249 5/1962 Hall _____ 317—230

JOHN W. HUCKERT, *Primary Examiner.*

DAVID J. GALVIN, *Examiner.*